United States Patent [19]

Sawada

[11] Patent Number: 5,366,039
[45] Date of Patent: Nov. 22, 1994

[54] ACCELERATION SLIP CONTROL DEVICE FOR A MOTOR VEHICLE

[75] Inventor: Mamoru Sawada, Aichi, Japan
[73] Assignee: Nippondenso Co. Ltd., Kariya, Japan
[21] Appl. No.: 977,438
[22] PCT Filed: Jun. 26, 1991
[86] PCT No.: PCT/JP91/00854
§ 371 Date: Apr. 22, 1993
§ 102(e) Date: Apr. 22, 1993
[87] PCT Pub. No.: WO93/00507
PCT Pub. Date: Jan. 7, 1993
[51] Int. Cl.$^5$ .......................... B60K 28/16; B60L 3/10
[52] U.S. Cl. .............................. 180/197; 364/426.02; 364/426.03; 364/426.05
[58] Field of Search ................... 180/197; 364/426.01, 364/426.02, 426.03, 426.05

[56] References Cited

U.S. PATENT DOCUMENTS

| | | |
|---|---|---|
| 4,672,934 | 6/1987 | Peter et al. . |
| 4,771,849 | 9/1988 | Leiber et al. . |
| 4,987,966 | 1/1991 | Fujita . |
| 5,117,934 | 6/1992 | Tsuyama et al. ............ 180/197 |
| 5,163,530 | 11/1992 | Nakamura et al. ........... 180/197 |
| 5,222,570 | 6/1993 | Kawamura et al. .......... 180/197 |

FOREIGN PATENT DOCUMENTS

| | | |
|---|---|---|
| 163940 | 12/1985 | European Pat. Off. . |
| 230745 | 8/1987 | European Pat. Off. . |
| 349993 | 1/1990 | European Pat. Off. . |
| 377099 | 7/1990 | European Pat. Off. . |
| 409200 | 1/1991 | European Pat. Off. . |
| 59-203963 | 11/1984 | Japan . |
| 60-224950 | 11/1985 | Japan . |
| 60-240531 | 11/1985 | Japan . |
| 62-203937 | 9/1987 | Japan . |
| 63-29031 | 2/1988 | Japan . |
| 1112131 | 4/1989 | Japan . |
| 1113534 | 5/1989 | Japan . |
| 1167429 | 7/1989 | Japan . |
| 1300028 | 12/1989 | Japan . |

OTHER PUBLICATIONS

Patent Abstract of Japan, vol. 12, No. 105 (M-681)(2952) Apr. 1988 re JP-A- 62-237074.

Primary Examiner—Mitchell J. Hill
Attorney, Agent, or Firm—Cushman, Darby & Cushman

[57] ABSTRACT

In an accelerator slip control device for a motor vehicle of the present invention, when the opening $\theta$ mw of a main throttle valve 8 has exceeded a standby starting opening $\theta$ sb at which the occurrence of acceleration slip is predicted, the opening $\theta$ sn of a sub-throttle valve 12 is set to a standby opening $\theta$ ss. These standby starting opening $\theta$ sb and standby opening $\theta$ ss are learned and updated on the basis of the driving torque of an internal combustion engine 2 when the acceleration slip is being controlled at an optimum value by acceleration slip control executed in the past, thereby enabling preventing the occurrence of excessive acceleration slip. Furthermore, when the occurrence of the acceleration slip is predicted, even before the occurrence of the acceleration slip, it is possible to reduce the time required to drive the sub-throttle valve 12 to a target opening of the acceleration slip control, at the time of occurrence of the acceleration slip, because the opening of the sub-throttle valve 12 is preset to the standby opening $\theta$ ss which is suitable for restraining the acceleration slip.

13 Claims, 8 Drawing Sheets

ACCELERATION SLIP CONTROL DEVICE FOR A MOTOR VEHICLE

TECHNICAL FIELD

The present invention relates to an acceleration slip control device for a motor vehicle for improving vehicle acceleration performance by restraining excessive slip (acceleration slip) of driving wheels which occurs during start-up and acceleration of the vehicle.

BACKGROUND ART

A conventional acceleration slip control device for a motor vehicle is designed to begin to control acceleration slip when the speed of a driving wheel has exceeded a reference speed, or when the slip ratio of the driving wheels has exceeded a reference slip ratio. In this acceleration slip control, the opening of the throttle valve is controlled by a feedback control system so that for example the slip ratio of the driving wheels may correspond to a target slip ratio.

The acceleration slip control device in conventional use for motor vehicles, however, has such a problem that if the acceleration slip control is started after the driving wheel speed has exceeded a reference speed, there takes place a delay time between the throttle valve opening and a target opening, resulting in a lowered initial response property of the acceleration slip control.

That is, if throttle valve operation starts upon the detection of an acceleration slip, the driving wheels slip excessively during the period of time delay until the throttle valve opening agrees with the target opening, resulting in an insufficient acceleration performance.

It is, therefore, an object of the present invention to provide an acceleration slip control device for motor vehicles which is capable of realizing a good acceleration performance by presetting the initial throttle valve opening suitable to restrain the acceleration slip in accordance with a predicted occurrence of the acceleration slip.

SUMMARY OF THE INVENTION

In the present invention, the throttle valve opening is preset to a specific initial opening when it is detected that the depth of the depression of an accelerator has exceeded a reference value at which the occurrence of acceleration slip of the driving wheels is predicted prior to the actual acceleration slip. In this case the driving torque produced by an internal combustion engine is delayed in response to the opening of the throttle valve. Accordingly there will sometimes occur acceleration slip of the driving wheels after the setting of the throttle valve opening to a specific initial opening. In the present invention, at this time, the throttle valve is driven quickly, to open from the initial opening to the target opening which is determined in accordance with the acceleration slip of the driving wheels. That is, the opening of the throttle valve is preset to an initial opening adapted to restrain the acceleration slip before the actual occurrence of the acceleration slip, so that the preset initial opening of the throttle valve is positioned close to the target opening during acceleration slip control. It is, therefore, possible for the acceleration slip control device of the present invention to reduce the time required to open the throttle valve from the initial opening to the target opening, as compared with the conventional acceleration slip control device.

The reference value stated above is updated on the basis of the amount of the throttle valve opening (throttle opening) when the acceleration slip is being controlled to an optimum value by the feedback control of the acceleration slip. That is, with an opening of the throttle set to an optimum value by the acceleration slip control of the present invention, it is possible to obtain the optimum acceleration performance on a current road surface on which the motor vehicle is traveling. The reference value of the depth of depression of the accelerator for predicting the occurrence of acceleration slip is updated on the basis of this throttle opening, thereby enabling improving prediction accuracy.

It is preferable that the reference value stated above be renewed on the basis of the condition of vehicle acceleration. That is, for example, the vehicle, entering upon a high-friction road surface from a low-friction road surface (a low-μ road), can be accelerated at a high acceleration speed without causing an acceleration slip to occur. Consequently, the reference value can be thus updated, on the basis of the accelerating condition of the vehicle, to a reference value which reflects up-to-date road surface information of the vehicle even when no acceleration slip is taking place.

It is also preferable that the initial throttle valve opening set when the occurrence of the acceleration slip is foreseen be updated on the basis of the throttle opening and the accelerating condition of the vehicle with the acceleration slip being controlled to an optimum value by the feedback control system. Thus the initial opening becomes an opening reflecting the frictional state of the road surface on which the vehicle is running, thereby preventing the occurrence of an excessive acceleration slip and stall during acceleration.

Furthermore, if the reference value and the initial opening of the throttle valve have been updated to smaller values in relation to the frictional state of the road surface on which the vehicle is running, the stall threatening to occur during acceleration can be decreased by gradually opening the throttle valve, whose opening has been set to the initial opening, with the lapse of time, in the direction in which the throttle valve will be opened.

BEST MODE FOR CARRYING OUT THE INVENTION

Figure 1:
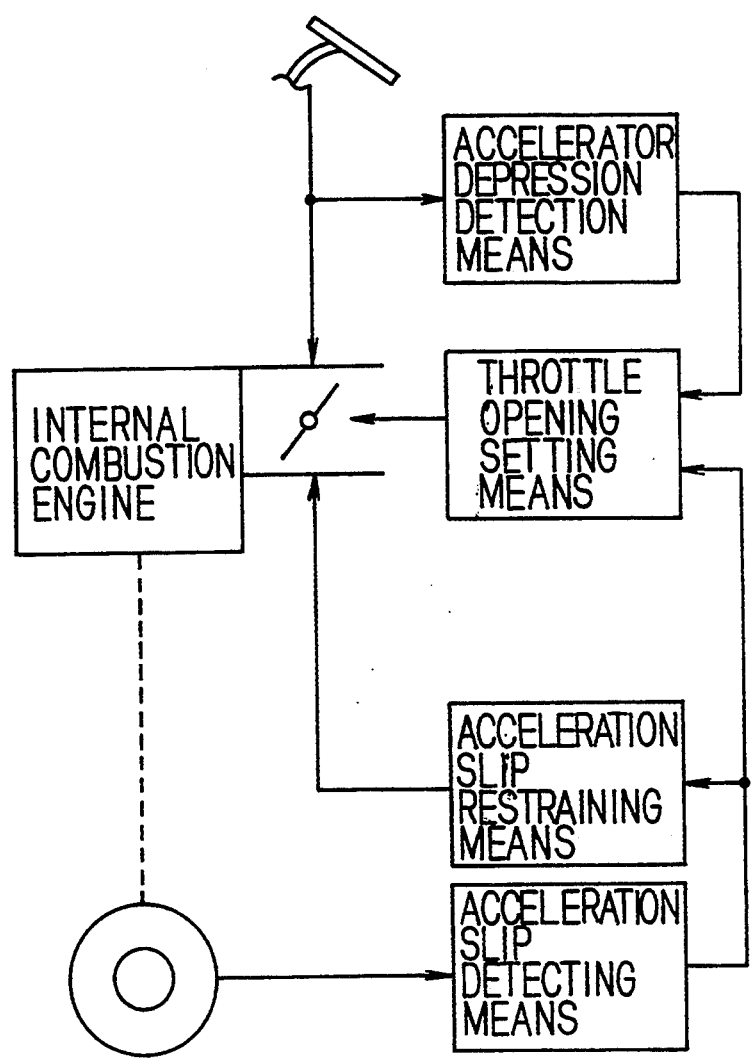
FIG. 1 is a block diagram showing a basic constitution of an acceleration slip control device for a motor vehicle of the present invention.

FIG. 1 shows a basic constitution of the acceleration slip control device of the present invention. Hereinafter each component element of the device shown in FIG. 1 will be explained in detail.

Figure 2:
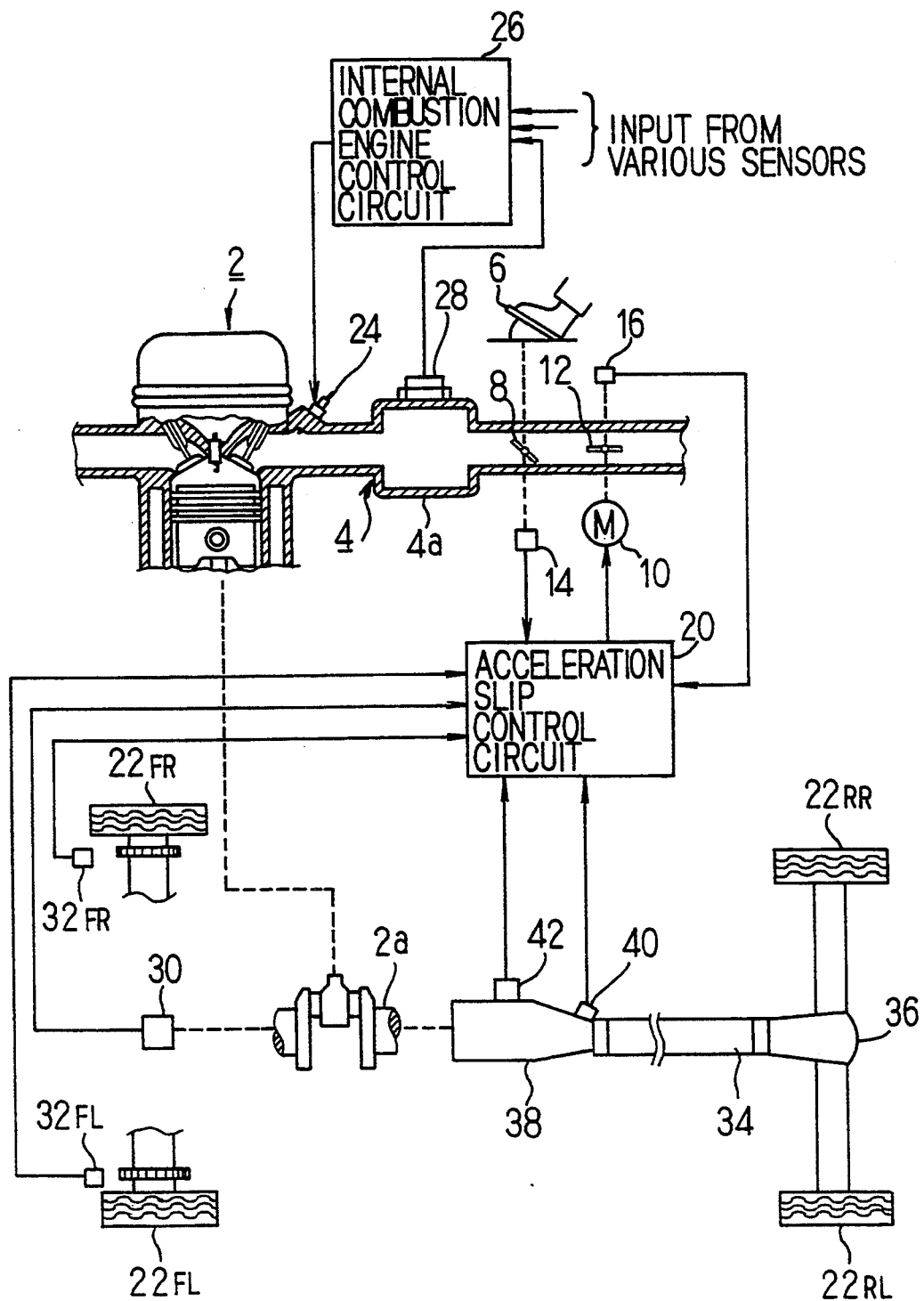
FIG. 2 is a block diagram showing the constitution of an internal combustion engine system mounted with one embodiment of the acceleration slip control device for a motor vehicle according to the present invention.

FIG. 2 is a block diagram showing the constitution of the embodiment of the acceleration slip control device for a motor vehicle according to the present invention. In the embodiment shown in FIG. 2, the acceleration slip control device is mounted on a front-engine, rear-drive (FR) motor vehicle which is driven by an internal combustion engine 2 as a driving power source.

As shown in FIG. 2, a surge tank 4a for suppressing intake air pulsation is formed in an intake air passage 4 of the internal combustion engine. On the upstream side of the surge tank 4a are located a main throttle valve 8 which is opened and closed in connection with an accelerator pedal 6 and a sub-throttle valve 12 which is opened and closed by a drive motor 10. The main throttle valve 8 and the sub-throttle valve 12 are connected with each other and are fitted with a main throttle opening sensor 14 and a sub-throttle opening sensor 16 which detects the opening of these valves. A detection signal from each of these sensors 14 and 16 is input into an acceleration slip control circuit 20.

A fuel injection valve 24 for supplying fuel to the internal combustion engine 2 operates in accordance with a fuel injection command signal from a known internal combustion engine control circuit 26. The fuel injection command signal is prepared in accordance with a specific program of the internal combustion engine control circuit 26, on the basis of the real-time operating condition of the internal combustion engine 2, that is, information from an intake air pressure sensor 28 for detecting a surge tank 4a pressure and various other sensors.

The acceleration slip control circuit 20 detects acceleration slip occurring at the right and left driving wheels 22RL 22RR and 22RL, to open and close the sub-throttle valve 16 by the use of the driving motor 10, thereby restraining the driving torque of the internal combustion engine 2 to control the acceleration slip. For this acceleration slip control a detection signal is input into the acceleration slip control circuit 26 from the various sensors described below which are designed to respond to the running condition of the vehicle.

The engine speed sensor 30 functions to detect the rotational speed of a crankshaft 2a of the internal combustion engine 2. The detection signal is input into the acceleration slip control circuit 20 and the internal combustion engine control circuit 26.

Driven wheel speed sensors 32FR and 32FL detect respectively the rotational speed of right and left driven wheels (right and left front wheels) 22FR and 22FL. The detection signals thus produced from these sensors are utilized for the computation of a vehicle speed.

A driving wheel speed sensor 40 serves to detect a mean rotational speed of the right and left driving wheels (right and left rear wheels) 22RR and 22RL. This sensor is mounted on an output shaft of a transmission 38 which transmits the rotation of the crankshaft 2a to the right and left driving wheels 22RR and 22RL through a propeller shaft 34 and a differential gearing 36. A transmission gear ratio sensor 42 for detecting the gear ratio of the transmission 38 is also mounted in the transmission 38.

Next, by referring to FIG. 3 the constitution of the acceleration slip control circuit 20 will be explained.

Figure 3:
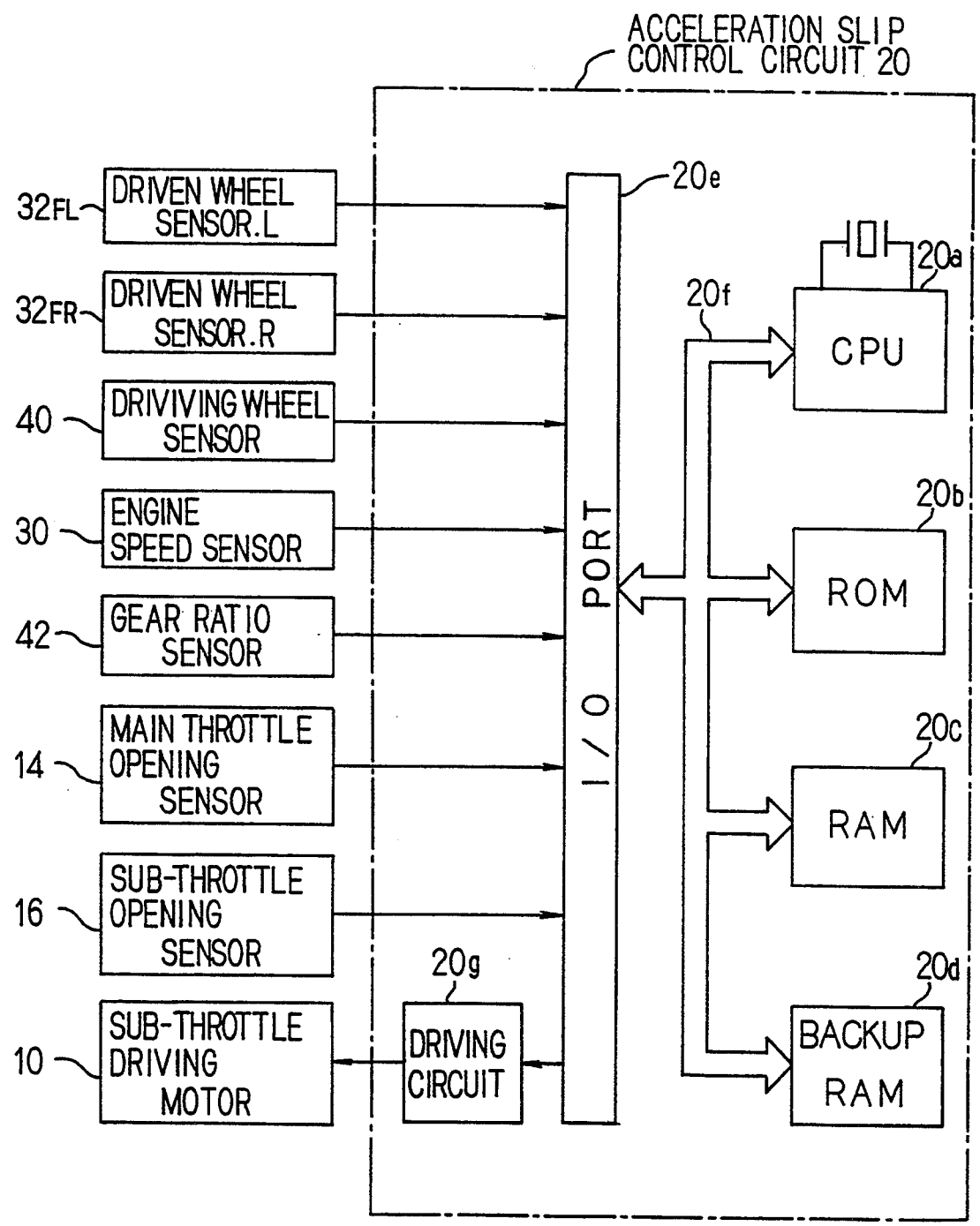
FIG. 3 is a block diagram showing an acceleration slip control circuit of the present invention.

As shown in FIG. 3, the acceleration slip control circuit 20 is composed of a microcomputer. The microcomputer, as known, is composed a CPU 20a for executing arithmetic and logic operations as is well known, a ROM 20b for storing a control program, table, etc. described later on, a RAM 20c capable of randomly reading and writing information, a backup RAM 20d for holding stored information by a power supply, an input-output port 20e capable of receiving and transmitting information between the microcomputer and external means, and a bus 20f for interconnecting the above-mentioned components.

Furthermore a driving circuit 20g connected to the input-output port 20e outputs a driving signal to the sub-throttle driving motor 10 for driving the sub-throttle valve 12. This driving circuit 20g analyzes data indicating a target opening $\theta$ SP of the sub-throttle valve 12, outputting a necessary driving signal.

The acceleration slip control circuit 20 constituted as described above executes operation in accordance the control program stored in the ROM 20b, thereby controlling acceleration slip which occurs at the right and left driving wheels 22RR and 22RL. Hereinafter the acceleration slip control carried out by this acceleration slip control circuit 20 will be explained by referring to the flowchart in FIG. 4. To facilitate an understanding of the details of the process, one example of variations of the main and sub opening $\theta$ mn and $\theta$ sn of the throttle valves 8 and 12 and the driving wheel speed V mn by the acceleration slip control is shown in FIG. 5. By referring to this drawing, the acceleration slip control will be explained.

Figure 4:
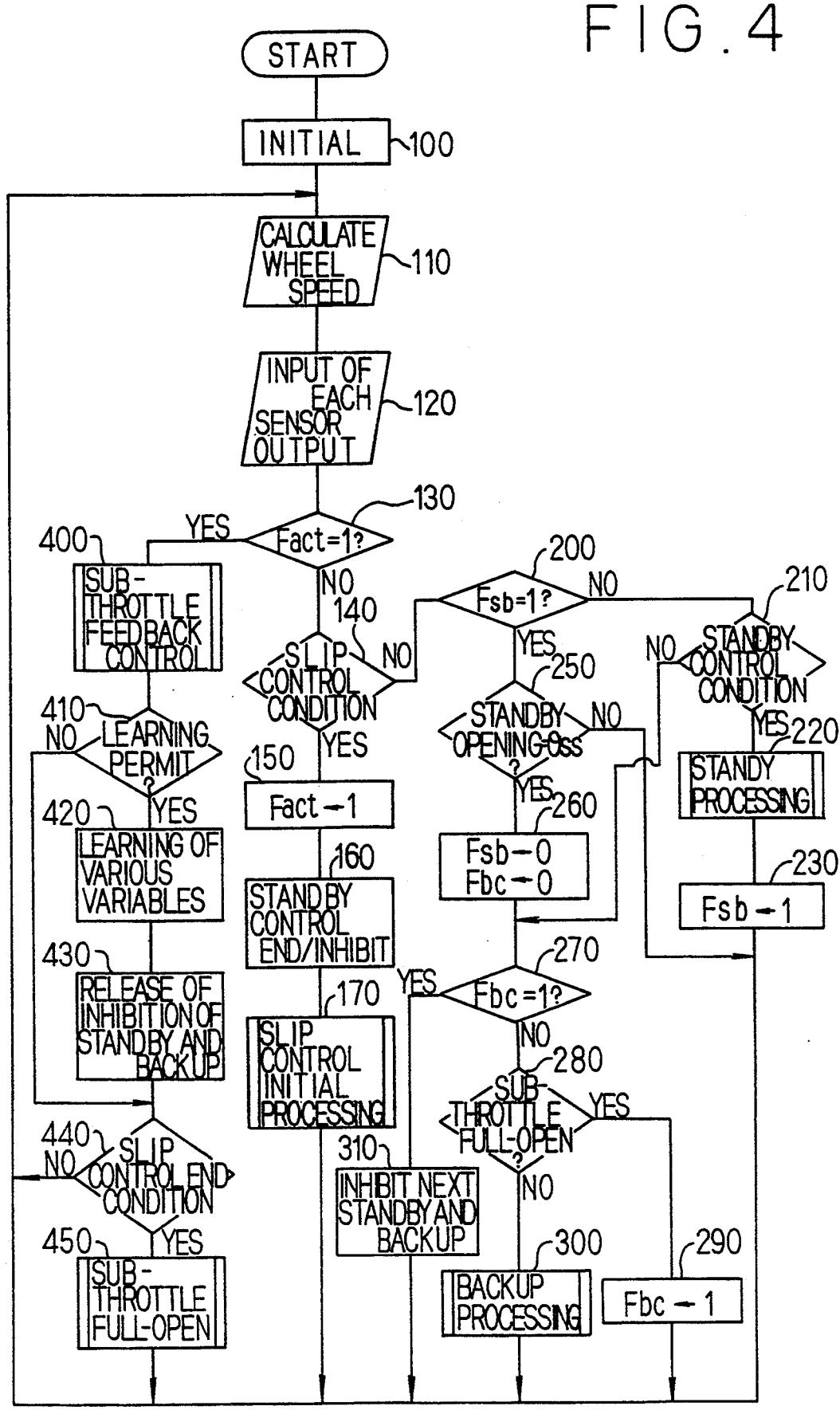
FIG. 4 is a flowchart showing a process procedure of the acceleration slip control of the present invention.
Figure 5:
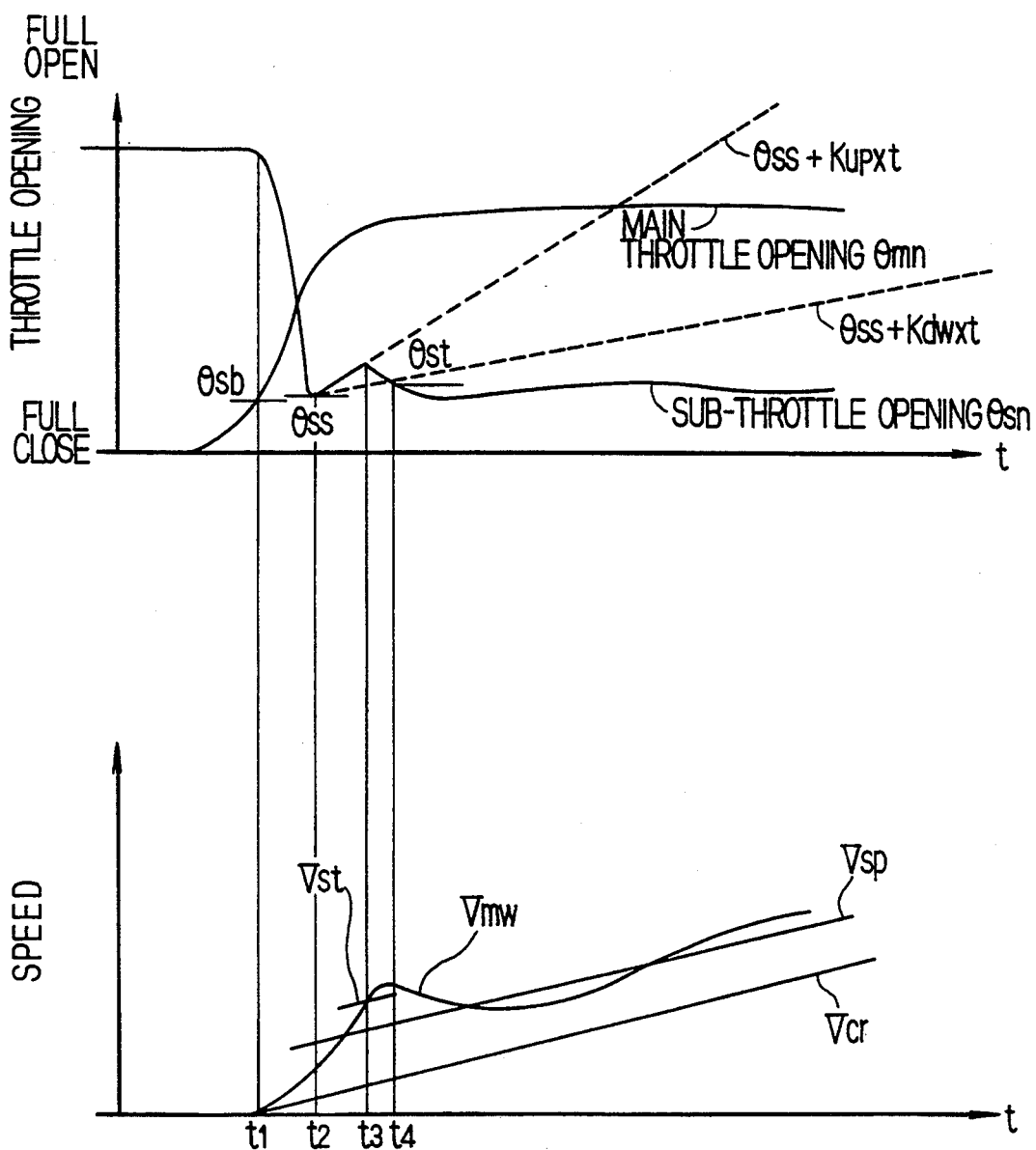
FIG. 5 is a time chart showing one example of the acceleration slip control of the present invention.

The program of the flowchart shown in FIG. 4 is read from the ROM 20b simultaneously with the start of the internal combustion engine 2, and its processing is started at the CPU 20a. First, during the initial period of processing, initializing processing is performed, such as the initial setting of various flags to be used in the check of storage elements and the program (Step 100).

A vehicle speed V cr is calculated at Step 110 as a mean speed of the right and left driven wheel speeds which are detected by means of the driven wheel speed sensors 32FR and 32FL. Vehicle acceleration $\alpha$ is also calculated by dividing a change in this vehicle speed V cr by the elapsed time required for the change. Furthermore, the control starting speed V st is given by adding a specific value to the vehicle speed V cr or by multiplying the vehicle speed V cr by a specific coefficient.

To grasp the current state of vehicle operation, detection signals are input from the engine speed sensor 30, the main and sub throttle opening sensors 14 and 16, and the transmission gear ratio sensor 42 (Step 120).

Next, whether or not the acceleration slip control (feedback control of the sub-throttle valve 12) is under execution is judged by the value of the flag F act (Step 130). The value of this flag F act, as described later, is set to "1" during the acceleration slip control. When the value of the flag F act is "0", the acceleration slip control has not been executed yet, and therefore a decision is made on whether or not there has been established a condition for starting the acceleration slip control at this point of time (Step 140). This processing decides whether or not the current driving wheel speed V mw exceeds the control starting speed V st. When the condition for performing the acceleration slip control has been established, the value of the flag F act will be set to "1" (Step 150). Next, a standby control which is another mode of the acceleration slip control described later is ended or inhibited (Step 160), going back to Step 110 after execution of the initial processing of the acceleration slip control (Step 170).

Figure 7:
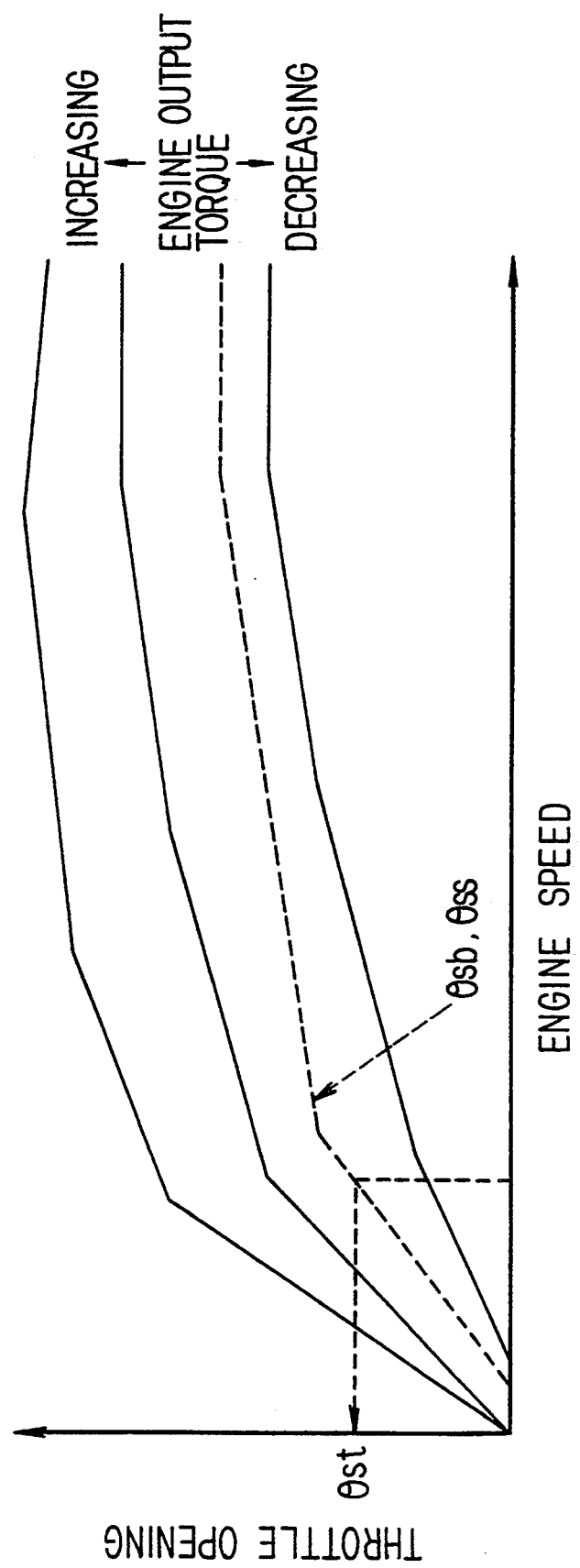
FIG. 7 is a characteristic view showing the equal torque curve of the internal combustion engine.

This initial processing of the acceleration slip control is to be carried out in the initial period of feedback control of the sub-throttle valve 12, to thereby set the initial opening $\theta$ st of the sub-throttle valve 12 and to drive the sub-throttle valve 12 to the initial opening $\theta$ st. This initial opening $\theta$ st is determined on the basis of the gear ratio of the transmission 38 and the speed of the internal combustion engine 2 in accordance with the equal torque curve of the internal combustion engine 2. One example of the equal torque curve when the gear ratio of the transmission 38 is at a first speed is shown in FIG. 7.

In the present embodiment, an equal torque curve corresponding to a driving torque is selected from the driving torque of the internal combustion engine 2 for controlling the acceleration slip to an optimum value when the acceleration slip control is previously effected. The initial opening $\theta$ st of the sub-throttle valve 12 is set on the basis of the gear ratio of the transmission 38 and the rotational speed of the internal combustion engine 2 in accordance with the equal torque curve thus selected. Then the sub-throttle valve 12 is driven by the drive motor 10 to open at a maximum speed from the opening $\theta$ sn to the thus preset initial opening $\theta$ st. Accordingly, the initial processing of the acceleration slip control can quickly drive the sub-throttle valve 12 to open from the opening $\theta$ sn to the opening at which the driving torque regarded to be optimum for restraining acceleration slip in the previous acceleration slip control is produced.

Furthermore, at the time of the initial processing of the acceleration slip control, the driving wheel target speed V sp is set. The driving wheel target speed V sp, as known, is calculated out by adding a specific slip ratio to the vehicle speed V cr, thus being set lower than the control starting speed V st. This is because the driving wheel speed V mw detected by the driving wheel speed sensor 40 varies with vehicle body vibration and if the control starting speed V st is set at a lower speed, the acceleration slip control will be started improperly.

The period of time from t3 to t4 in FIG. 5 indicates a result of the control given by the initial processing of the acceleration slip control. At the time t3 in FIG. 5, if the driving wheel speed V mw exceeds the control starting speed V st, a condition for starting the acceleration slip control is established. At this time, the initial processing of the acceleration slip control is carried out to quickly drive the sub-throttle valve 12 to open from the opening $\theta$ sn to the initial opening $\theta$ st, thereby lowering the driving torque of the internal combustion engine 2 and decreasing the driving wheel speed V mw to the target speed V sp.

According to the acceleration slip control of the present embodiment, as is clear from FIG. 5, the opening $\theta$ sn of the sub-throttle valve 12 has been driven to the vicinity of the initial opening $\theta$ st prior to the execution of the acceleration slip control by a common feedback control. Accordingly, in the initial processing of the acceleration slip control, it is possible to instantly drive to open the sub-throttle valve 12 from the opening $\theta$ sn to the target initial opening $\theta$ st.

Subsequently, a process for driving the sub-throttle valve 12 in advance from the opening $\theta$ sn to the vicinity of the initial opening $\theta$ st (hereinafter referred to as the standby processing and the backup processing) will be explained.

When the flag F act is in a reset state and no condition for starting the acceleration slip control has been established yet, the result of the decision at Step 140 will become "NO", proceeding to Step 200. At Step 200, whether or not the standby processing, which will be described later, is under execution is decided by use of the value of the flag F sb. This flag F sb, as described later, is set to the value "1" during the standby processing. When the value of this flag F sb is "0", a decision will be made on whether or not a condition for executing the standby processing has been established (Step 210). When this condition has not been established, the procedure will proceed to Step 270 described later. At Step 210 it is decided that the standby processing starting condition has been established when the opening $\theta$ mn of the main throttle valve 8 indicating the depth of depression of the accelerator pedal 6 has exceeded a standby starting opening $\theta$ sb. This standby starting opening $\theta$ sb is updated, similarly to the initial opening $\theta$ st previously stated, on the basis of the driving torque of the internal combustion engine for controlling the acceleration slip to an optimum value at the time of previous the execution of the acceleration slip control. Therefore, when the opening $\theta$ mn of the main throttle valve 8 has exceeded the standby starting opening $\theta$ sb at which the driving torque described above is produced, it is anticipated that acceleration slip is very much likely to occur thereafter. It should be noted, therefore, that the standby starting opening $\theta$ sb, corresponding to the above-described driving torque, changes with the rotational speed of the internal combustion engine 2 of the vehicle and the gear ratio of the transmission 38.

At Step 210, when it has been judged that the standby processing condition has been established, the standby processing will immediately be executed (Step 220). Subsequently, the value of the flag F sb indicating the standby processing is under execution is set (Step 230), then returning process control to Step 110.

Here, the standby processing is for driving the opening $\theta$ sn of the sub-throttle valve 12 commonly set in a wide-open state to the standby opening $\theta$ ss at a maximum speed of the driving motor 10.

This standby opening $\theta$ ss, like the above-described initial opening $\theta$ st and the standby starting opening $\theta$ sb, is learned on the basis of the driving torque of the internal combustion engine 2 which controls the acceleration slip to an optimum value at the time of the acceleration slip control previously carried out, and is updated to the opening which holds the acceleration slip at an optimum value. Therefore, when the occurrence of the acceleration slip is expected, even before the occurrence of the acceleration slip, by this standby processing, the sub-throttle valve 12 is driven to the opening (standby opening $\theta$ ss) suitable for previously restraining the acceleration slip, thus enabling prevention of the occurrence of an excessive acceleration slip.

Variations in the opening $\theta$ mn and $\theta$ sn of the throttle valves 8 and 12 in this standby processing are indicated during the period of time t1 to t2 shown in FIG. 5. That is, when the opening $\theta$ mn of the main throttle valve 8 has exceeded the standby starting opening $\theta$ (time t1), the sub-throttle valve 12 is immediately driven to the standby opening $\theta$ ss.

In the case where the standby processing is under execution and no condition for starting the acceleration slip control has been established yet (time t2 to t3 in FIG. 5), the processing proceeds from Step 200 to Step 250. At Step 250, a decision is made on whether or not the opening $\theta$ sn of the sub-throttle valve 12 has reached the standby opening $\theta$ ss, that is, on whether or not the standby processing has been completed. Then, when it has been judged that the standby processing has not been completed, the processing will go back to Step 110.

In the meantime, when it has been judged that the standby processing has been completed, the flag F sb will be reset and also the flag F bc to be set at the time of completion of the backup processing will be reset (Step 260). Subsequently, a decision is made on whether or not the backup processing has been completed, on the basis of the value of the flag F bc (Step 270). At the point of time of completion of the standby processing, the backup processing is not completed yet and the flag F bc is reset at Step 260, and accordingly, at Step 270, the result of the decision will indicate "NO". In this case, the processing proceeds to Step 280, at which a decision is made on whether or not the opening $\theta$ sn of the sub-throttle valve 12, which is controlled to be gradually opened by the backup processing, is in a wide-open position. When, at Step 280, the sub-throttle valve 12 is judged to be in the wide-open position, the backup processing has been completed and therefore the flag F bc is set to "1" (Step 290), then going back to Step 110.

At Step 280, when the sub-throttle valve 12 is judged to be not in the wide-open state, the backup processing is executed (Step 300). Here, the backup processing is a process for preventing a vehicle stall by gradually controlling the opening $\theta$ sn of the sub-throttle valve 12 which is closed to the standby opening $\theta$ ss by the standby processing. In this backup processing, the target opening $\theta$ sp of the sub-throttle valve 12 given by the following equation is calculated out to thereby drive the sub-throttle valve 12 to the target opening $\theta$ sp. When the target opening $\theta$ sp thus calculated out is larger than the opening $\theta$ mn of the main throttle valve 8, the sub-throttle valve 12 is instantly driven at the maximum speed of the motor 10 to open to the wide-open state.

$$\theta\ sp = med\ (\theta\ mn,\ \theta\ ss + K\ up.t,\ \theta\ ss + K\ dw.t)$$

where, med is an operator for selecting an intermediate value of a plurality of variables in ( ); K up and K dw are variables learned during the execution of the acceleration slip control described later, and are related with K up > K dw.

These variables K up and K dw are set for the purpose of preventing the occurrence of an excessive acceleration slip and vehicle stall during the execution of the backup processing.

Also when an emphasis is placed particularly on the prevention of the vehicle stall, the opening $\theta$ sn of the sub-throttle valve 12 may be directly controlled by the feedback control system in the backup processing so that vehicle acceleration will increase at a fixed rate until an acceleration slip occurs.

In this case, the target acceleration $\alpha$ cr, T is calculated as follows, using the vehicle acceleration $\alpha$ crm as an initial value which is caused by the driving torque of the internal combustion engine 2 for controlling the acceleration slip to an optimum value when the acceleration slip control is carried out.

$$\alpha\ cr,T = \alpha\ crm + K.t\ (K:\ constant)$$

Then, the sub-throttle valve 12 is driven in accordance with a deviation between the target acceleration $\alpha$ cr, T and the actual vehicle acceleration $\alpha$ cr.

In this case, there is a corresponding relationship between the driving torque of the internal combustion engine for controlling the acceleration slip to an optimum value when the acceleration slip control is carried out and the vehicle acceleration $\alpha$ crm. Furthermore, since the driving torque and the vehicle acceleration $\alpha$ cr are in a proportional relation within a range in which no acceleration slip occurs, the vehicle acceleration $\alpha$ cr is doubled with the doubling of the driving torque.

Therefore, increasing the vehicle acceleration $\alpha$ cr at a fixed rate will similarly increase the driving torque at a fixed rate. Consequently the opening $\alpha$ sn of the sub-throttle valve 12 also increases in a secondary-functional manner, thereby enabling the prevention of a stall during vehicle acceleration.

Variations in the opening $\theta$ mn and $\theta$ sn of the throttle valves 8 and 12 resulting from the backup processing (Step 300) are indicated in the period of time t2 to t3 shown in FIG. 5. In FIG. 5, the opening $\theta$ mn of the main throttle valve 8 exceeds $\theta$ ss + K up.t, and therefore the target opening $\theta$ sp becomes $\theta$ ss + K up.t. Accordingly, in this case, the opening $\theta$ sn of the sub-throttle valve 12 gradually increases along $\theta$ + K up.t. Furthermore, in FIG. 5, since there is established a condition for starting the acceleration slip control at the time t3 as stated previously, the $\theta$ sn of the sub-throttle valve 12 will not reach the full opening in this backup processing. Consequently in this case the processing of Step 290 will not be executed and the flag F bc keeps its reset state.

Next, the case that the opening $\theta$ sn of the sub-throttle valve 12 has been increased to full opening by the backup processing will be explained. In this case, the processing proceeds from Step 280 to Step 290, setting the flag F bc to the value of "1". Accordingly in the next processing at Step 270, the result of the decision becomes YES, proceeding to Step 310. At Step 310, the execution of subsequent standby processing and backup processing are inhibited.

That is, in this case, it is considered that, with the main throttle valve 8 in the wide-open state, the sub-throttle valve 12, after being driven toward closing, is driven to the wide-open state without causing acceleration slip to occur. Accordingly, if the standby processing and the backup processing are continued in accordance with current learning values, the vehicle acceleration performance will possibly be deteriorated, whereby the execution of the standby processing and the backup processing are inhibited until the standby starting opening $\theta$ sb, standby opening $\theta$ ss, and variables K up and K dw which are suitable for a current road surface and a driving condition are newly learned. Here, the inhibition processing at Step 310 can be accomplished by the value of the flag F sb being set at "1" and an apparent standby processing is under execution.

Next, a learning processing of these various learning values will be explained.

The above-described learning values are learned during the execution of the acceleration slip control by the feedback control system, and are updated to new learning values. Then, when the acceleration slip control starting condition is established and the flag F act is set to the value "1" (Step 150), the acceleration slip control is carried out prior to the standby processing and the backup processing (Step 400). In this acceleration slip control, the opening $\theta$ sn of the sub-throttle valve 12 is fed back so that the driving wheel speed V mw may correspond to the driving wheel target speed V sp.

At the time of execution of the acceleration slip control, it is judged whether or not the vehicle is in such a condition as permits learning each of the learning values previously stated (Step 410). At this Step 410, the acceleration slip has been controlled to the optimum value by the acceleration slip control carried out at Step 400; and when the running condition of the vehicle is determined simply by a relation between the road surface and the output power of the internal combustion engine, without any factor of external disturbance such as brake operation, it is judged that the vehicle is in the learning permitting condition. When the vehicle is in the learning permitting condition, each of the learning values is learned and updated (Step 420). Also, when the vehicle is in such a condition that the standby processing and the backup processing are inhibited, the inhibited condition is released (Step 430).

In the above-described learning, a driving torque suitable for vehicle driving on a current road surface is determined by the use of a map shown in FIG. 7 from the opening $\theta$ sn of the sub-throttle valve 12 at which the acceleration slip is being controlled to the optimum value by the acceleration slip control, the speed of the internal combustion engine 2, and the gear ratio of the transmission 38. Furthermore, the initial opening $\theta$ st corresponding to this driving torque, the standby starting opening $\theta$ sb, and the standby opening $\theta$ ss are calculated out from the gear ratio of the transmission 38 and the speed of the internal combustion engine 2.

Figure 6:
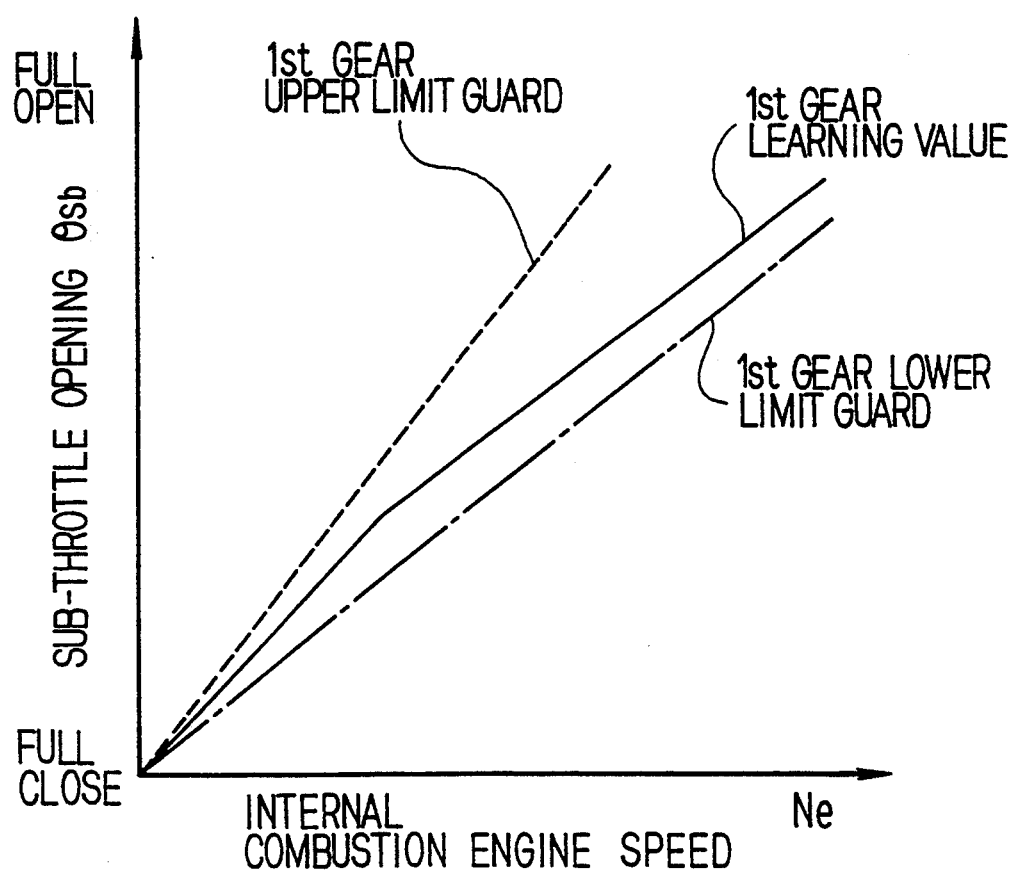
FIG. 6 is an explanatory view showing one example of a method for learning variables K up and K dw.

The variables K up and K dw also are calculated out on the basis of the above-mentioned driving torque. For example, suppose that when the vehicle is under the learning permitting condition, the gear ratio of the transmission 38 is at the first speed and the opening $\theta$ sn of the sub-throttle valve 12 in relation to the speed Ne of the internal combustion engine has changed as indicated by a solid line in FIG. 6. It becomes manifest from this information that the backup processing is preferably to be carried out in approximation to the transition of opening of the sub-throttle valve 12 indicated in the solid line in FIG. 6. It is, therefore, so learned that, in the backup processing, the values of the variables K up and K dw utilized in calculating the opening $\theta$ sn of the sub-throttle valve 12 will agree with the gradients of a dotted line and an alternate long and short dash line shown in FIG. 6.

Each of the initial opening $\theta$ st, standby starting opening $\theta$ sb and standby opening $\theta$ ss which are updated by the learning may be the same opening and also may be corrected in accordance with the characteristics of each value. For example, it is desired that the standby starting opening $\theta$ sb be corrected with transient characteristics of the main throttle valve 8 and the power of the internal combustion engine 2 taken into consideration. That is, the internal combustion engine control circuit 20 increases the quantity of fuel (control of fuel enrichment for acceleration) to be supplied to the internal combustion engine 2 if generally the opening $\theta$ mn of the main throttle valve 8 varies at a large rate. In this case, therefore, there is the possibility that the driving torque of the internal combustion engine 2 will exceed the driving torque suitable for the acceleration slip control before the opening $\theta$ mn of the main throttle valve 8 reaches the standby starting opening $\theta$ sb. Accordingly, when for example the control of fuel enrichment for acceleration is carried out on the basis of a rate of change of the opening $\theta$ mn of the main throttle valve 8, the opening $\theta$ mn of the main throttle valve 8 to be compared with the standby starting opening $\theta$ sb should be corrected as follows.

$$\theta\ mn = \theta\ mn + K.d\ \theta\ mn/dt \quad K: constant$$

whereby the standby starting opening $\theta$ sb will become capable of corresponding to changes in the driving torque of the internal combustion engine which are caused by the control of fuel enrichment for acceleration.

In the above example, the opening $\theta$ mn of the main throttle valve 18 for comparing with the standby starting opening $\theta$ sb was corrected, but it is to be understood that the standby starting opening $\theta$ sb may be directly corrected.

If it is decided that the vehicle is not in the learning permitting condition after the processing at Step 430 or at Step 410, processing returns to Step 110 whether or not the acceleration slip control ending condition has been established at Step 440. If the ending condition has been established, the opening $\theta$ sn of the sub-throttle valve 12 is fully opened (Step 450). On the other hand, when the ending condition has not been established, the procedure will go back to Step 110.

One example of the control result by this acceleration slip control is indicated at the time t4 and after in FIG. 5.

In the embodiment described above, the updating of each learning value was carried out during the acceleration slip control. This updating of each learning value can be performed other than during the acceleration slip control. Hereinafter, a method for updating the learning values will be explained by referring to a timing chart in FIG. 8.

As previously described, the driving torque of the internal combustion engine 2 for controlling the acceleration slip to an optimum value at the time of execution of the acceleration slip control is in a corresponding relationship with the optimum vehicle acceleration $\alpha$ crm produced by the driving torque. Therefore, it is possible to obtain a new driving torque for controlling the acceleration slip to an optimum value on the basis of the current vehicle acceleration $\alpha$ cr and the optimum vehicle acceleration $\alpha$ crm, and to update each learning value in accordance with this driving torque.

Figure 8:
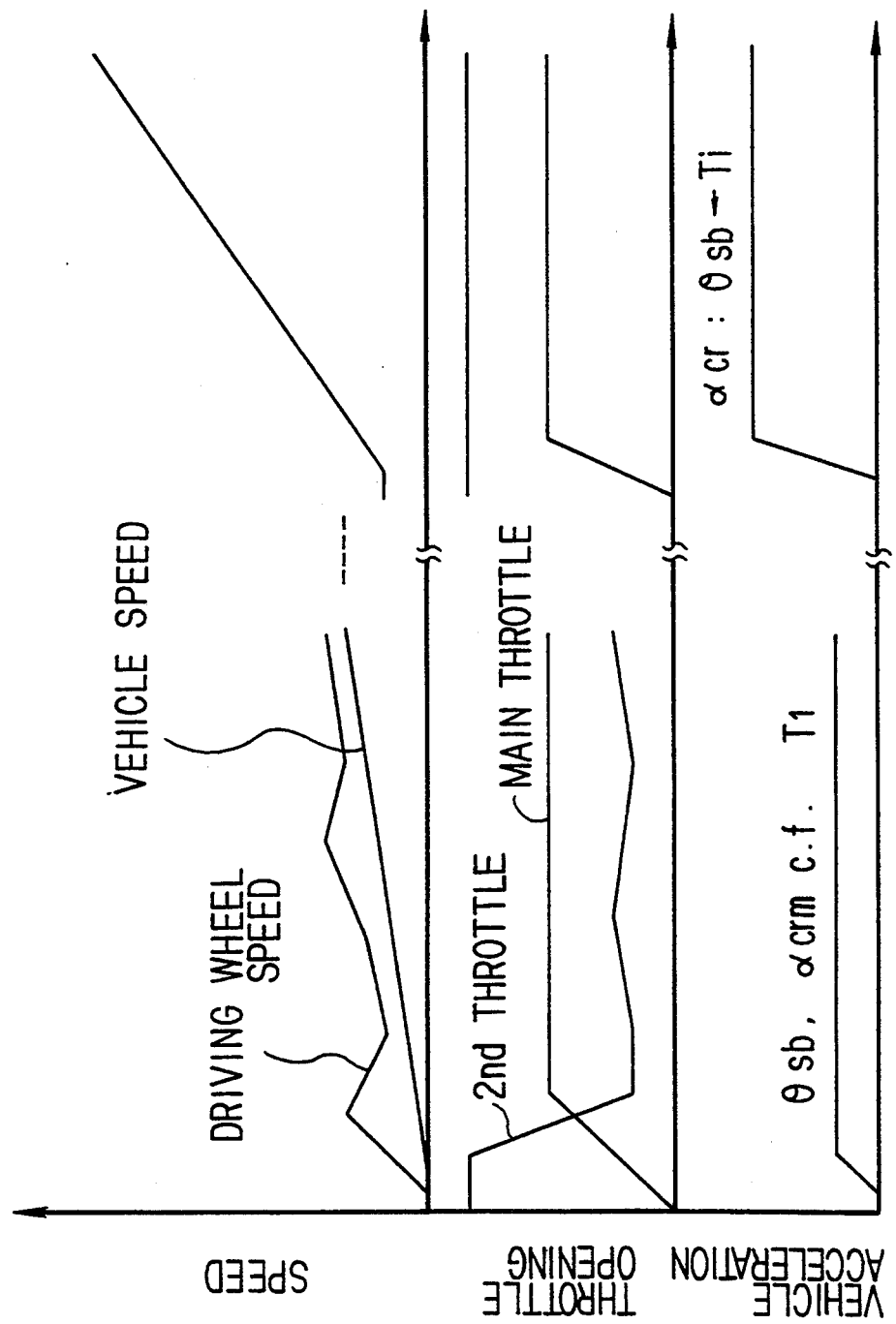
FIG. 8 is an explanatory view for explaining a method for learning each learning value based on vehicle acceleration.

To explain more concretely, suppose that the current vehicle acceleration $\alpha$ cr has become greater than the optimum vehicle acceleration $\alpha$ crm as shown in FIG. 8 when no acceleration slip control is being carried out. In this case, it can be judged that the road surface on which the vehicle is currently running is more slippery than the road surface on which learning of each learning value was performed. This change in the road surface condition increases the driving torque of the internal combustion engine 2 which controls the acceleration slip to an optimum value. This increased driving torque Ti, as shown in the following equation, can be given by multiplying the ratio of the current vehicle acceleration $\alpha$ cr and the optimum vehicle acceleration $\alpha$ crm by the previous driving torque T1.

$$Ti = (c/crm) \cdot T1$$

This is because the driving torque and the vehicle acceleration $\alpha$ cr are in a proportional relationship within a range in which no acceleration slip is taking place as previously stated and it is considered that the driving torque similarly increases with an increase in the vehicle acceleration $\alpha$ cr.

Each learning value is updated to a new learning value in accordance with the driving torque Ti that has thus increased.

It should be noted that the acceleration slip control device for a motor vehicle according to the present invention is not limited to the constitution of the embodiment described above and modifications are possible within the scope and spirit of the present invention.

In the above-described embodiment, for example only the opening $\theta$ sn of the sub-throttle valve 12 is adjusted to control the driving torque of the internal combustion engine and the acceleration slip; however, the slip control may be carried out by the use of the braking system of the motor vehicle. In this case, a burden of the braking system on the acceleration slip control can be reduced to a large extent by performing an appropriate acceleration slip control by means of the sub-throttle valve 12 explained above. When the braking system is operating, the learning of each learning value is not executed, and therefore no wrong learning will occur to cause an improper acceleration.

In the above-described embodiment, the sub-throttle valve 12 is provided in relationship with the main throttle valve 8 and its opening and closing operation is controlled. However, a single linkless throttle valve may be provided in the intake system of the internal combustion engine 2. In this case, the opening and closing operation of the linkless throttle valve is controlled prior to the operation of the accelerator pedal at the time of the standby processing, backup processing and acceleration slip control.

INDUSTRIAL APPLICABILITY

The acceleration slip control device for motor vehicles of the present invention, as described above, is used in a motor vehicle in which the throttle valve is mounted in the intake system of the internal combustion engine so that the quantity of intake air will be controlled by the opening of the throttle valve, thereby largely improving the initial response property of the acceleration slip control.

We claim:

1. An acceleration slip control device for a motor vehicle for restraining an acceleration slip from occurring at driving wheels of a motor vehicle which are driven by an internal combustion engine by adjusting an opening of a throttle valve mounted in an intake system of said internal combustion engine to control a quantity of intake air, said acceleration slip control device comprising:
   accelerator depression detecting means for detecting an amount of depression of an accelerator which controls said opening of said throttle valve;
   accelerator increase detecting means for detecting said amount of depression of said accelerator that has increased greater than an accelerator position reference value at which said occurrence of acceleration slip is expected;
   acceleration slip detecting means for detecting said occurrence of acceleration slip during an acceleration of said driving wheels;
   throttle valve initial setting means for setting said opening of said throttle valve to an initial opening to restrain said expected occurrence of acceleration slip until said occurrence of acceleration slip is detected by said acceleration slip detecting means when said greater amount of depression of said accelerator than said accelerator position reference value has been detected by said accelerator increase detecting means; and
   acceleration slip restraining means for restraining said occurrence of acceleration slip at said driving wheels, by driving said throttle valve in accordance with said acceleration slip when said occurrence of acceleration slip has been detected by said acceleration slip detecting means.

2. An acceleration slip control device for a motor vehicle as claimed in claim 1, wherein said accelerator position reference value in said accelerator increase detecting means is updated to a value suitable for a road surface on which said motor vehicle is running, on basis of said opening of said throttle valve which is driven by said acceleration slip restraining means.

3. An acceleration slip control device for a motor vehicle as claimed in claim 1 or 2, further comprising:
   operation speed detecting means for detecting a speed of operation of said accelerator; and
   accelerator position reference value correcting means for correcting said accelerator position reference value to a small value when said operation speed of said accelerator is high.

4. An acceleration slip control device for a motor vehicle as claimed in claim 1, wherein said initial opening set by said throttle valve initial setting means is updated to an opening suitable for a road surface on which said motor vehicle is running, on a basis of said opening of said throttle valve which is driven by said acceleration slip restraining means.

5. An acceleration slip control device for a motor vehicle as claimed in claim 1, further comprising:
   throttle valve driving means for gradually driving said throttle valve set to said initial opening by said throttle valve initial setting means, open with a lapse of time until said occurrence of acceleration slip is detected by said acceleration slip detecting means.

6. An acceleration slip control device for a motor vehicle as claimed in claim 1, further comprising:
   accelerating condition detecting means for detecting an accelerating condition of a motor vehicle, and for updating said accelerator position reference value to a value suitable for a road surface on which said motor vehicle is running, on a basis of said accelerating condition detected by said accelerating condition detecting means.

7. An acceleration slip control device for a motor vehicle as claimed in claim 6, further comprising:
   operating speed detecting means for detecting an operating speed of said accelerator; and
   accelerator position reference value correcting means for correcting said accelerator position reference value to a small value when said operating speed of said accelerator is high.

8. An acceleration slip control device for a motor vehicle as claimed in claim 1, further comprising:

accelerating condition detecting means for detecting an accelerating condition of a motor vehicle, to thereby update said initial opening set by said throttle valve initial setting means to an opening suitable for a road surface on which said motor vehicle is running, on a basis of said accelerating condition detected by said accelerating condition detecting means.

9. An acceleration slip control device for a motor vehicle as claimed in claim 1, further comprising:
accelerating condition detecting means for detecting an accelerating condition of said motor vehicle; and
throttle valve driving means for driving to gradually open said throttle valve with a lapse of time, at a point of time of detection of a negative change in said accelerating condition detected by said accelerating condition detecting means, during said driving of said throttle valve to said initial opening by said throttle valve initial setting means.

10. An acceleration slip control device for a motor vehicle as claimed in claim 1, further comprising:
driving torque estimating means for estimating a driving torque suitable for a frictional condition of a road surface on which said motor vehicle is running; and
throttle valve limiting means for limiting said opening of said throttle valve to a limited reference opening in a case that said opening of said throttle valve corresponding to said amount of depression of said accelerator has exceeded said limited reference opening, at which time said driving torque will be estimated by said driving torque estimating means.

11. An acceleration slip control device for a motor vehicle as claimed in claim 10, wherein said opening of said throttle valve limited to said limited reference opening by said throttle valve limiting means is gradually opened with a lapse of time.

12. An acceleration slip control device for a motor vehicle for restraining an acceleration slip from occurring at driving wheels of a motor vehicle which are driven by an internal combustion engine with an accelerator and a main throttle valve, by adjusting an opening of a sub-throttle valve mounted in an intake system of said internal combustion engine to control a quantity of intake air, said acceleration slip control device comprising:
accelerator depression detecting means for detecting an amount of depression of said accelerator which controls said opening of said main throttle valve;
possibility detecting means for detecting a possibility of said acceleration slip occurring by comparing said amount of depression of said accelerator with a first accelerator position reference value at which said occurrence of acceleration slip is expected;
acceleration slip detecting means for detecting said occurrence of acceleration slip during an acceleration of said driving wheels by comparing a driving wheel speed with a second accelerator position reference value;
sub-throttle valve initial setting means for setting, when said possibility of acceleration slip is detected by said possibility detecting means, said opening of said sub-throttle valve to an initial opening to restrain said expected occurrence of acceleration slip until said occurrence of acceleration slip is detected by said acceleration slip detecting means; and
acceleration slip restraining means for restraining said occurrence of acceleration slip at said driving wheels, by driving said sub-throttle valve in accordance with said acceleration slip when said occurrence of acceleration slip has been detected by said acceleration slip detecting means.

13. An acceleration slip control device for a motor vehicle for restraining an acceleration slip from occurring at driving wheels of a motor vehicle which are driven by an internal combustion engine with an accelerator and a main throttle valve, by adjusting an opening of a sub-throttle valve mounted in an intake system of said internal combustion engine to control a quantity of intake air, said acceleration slip control device comprising:
accelerator depression detecting means for detecting an amount of depression of said accelerator which controls said opening of said main throttle valve;
possibility detecting means for detecting a possibility of said acceleration slip occurring in response to said amount of depression of said accelerator;
acceleration slip detecting means for detecting said occurrence of acceleration slip during an acceleration of said driving wheels;
sub-throttle valve initial setting means for forcibly setting said opening of said sub-throttle valve from a fully open position to a reduced initially open position to restrain said expected acceleration slip until said occurrence of acceleration slip is detected by said acceleration slip detecting means; and
acceleration slip restraining means for restraining said occurrence of acceleration slip at said driving wheels, by driving said sub-throttle valve in accordance with said acceleration slip when said occurrence of acceleration slip has been detected by said acceleration slip detecting means.

* * * * *